US011970602B2

(12) United States Patent
Wu et al.

(10) Patent No.: US 11,970,602 B2
(45) Date of Patent: Apr. 30, 2024

(54) ETHYLENE/ALPHA-OLEFIN INTERPOLYMER COMPOSITIONS WITH IMPROVED LONG TERM HEAT AGING PERFORMANCE

(71) Applicant: Dow Global Technologies LLC, Midland, MI (US)

(72) Inventors: Xiaosong Wu, Sugar Land, TX (US); Guang Ming Li, Sugar Land, TX (US); Bo Lv, Shanghai (CN); Tao Han, Shanghai (CN); Colin LiPiShan, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/969,972

(22) PCT Filed: Feb. 14, 2018

(86) PCT No.: PCT/CN2018/076785
§ 371 (c)(1),
(2) Date: Aug. 13, 2020

(87) PCT Pub. No.: WO2019/157687
PCT Pub. Date: Aug. 22, 2019

(65) Prior Publication Data
US 2020/0399456 A1 Dec. 24, 2020

(51) Int. Cl.
C08L 23/16 (2006.01)
C08F 210/18 (2006.01)

(52) U.S. Cl.
CPC ............ C08L 23/16 (2013.01); C08F 210/18 (2013.01); C08L 2205/025 (2013.01)

(58) Field of Classification Search
CPC .. C08F 23/16; C08F 2205/025; C08F 210/18; C08F 2/001; C08F 2/38; C08F 2/06; C08F 4/65927; C08F 2500/17; C08F 2500/32; C08F 2500/34; C08F 2420/05; C08L 23/16; C08L 2205/025
See application file for complete search history.

(56) References Cited

U.S. PATENT DOCUMENTS

| 6,566,446 B1 | 5/2003 | Parikh et al. | |
| 6,686,419 B2 | 2/2004 | Wouters et al. | |
| 6,699,573 B1* | 3/2004 | Katzer | B32B 27/32 |
| | | | 428/221 |
| 8,299,189 B2 | 10/2012 | Boone et al. | |
| 9,234,093 B2 | 1/2016 | Ellul et al. | |
| 9,422,383 B2 | 8/2016 | LiPiShan et al. | |
| 9,580,587 B2 | 2/2017 | Clayfield et al. | |
| 2004/0048698 A1* | 3/2004 | Kanemitsu | A63B 49/02 |
| | | | 473/520 |
| 2004/0122190 A1* | 6/2004 | Cady | C08L 23/16 |
| | | | 524/543 |
| 2012/0116021 A1 | 5/2012 | Liang et al. | |
| 2013/0316111 A1* | 11/2013 | Wu | C08L 47/00 |
| | | | 428/36.9 |
| 2014/0287178 A1* | 9/2014 | Clayfield | C08L 23/14 |
| | | | 428/36.9 |
| 2014/0378602 A1* | 12/2014 | Walther | C08L 23/0807 |
| | | | 525/240 |
| 2015/0274867 A1 | 10/2015 | LiPiShan et al. | |
| 2015/0368450 A1* | 12/2015 | Sato | C08L 23/16 |
| | | | 525/232 |
| 2019/0241726 A1* | 8/2019 | Lummerstorfer | C08L 23/142 |

FOREIGN PATENT DOCUMENTS

| CA | 1334694 C | 3/1995 |
| CN | 102030949 | 4/2011 |
| CN | 107337859 | 11/2017 |
| DE | 4436486 A1 | 4/1996 |
| EP | 101175 B1 | 10/1986 |
| EP | 0758346 | 2/1997 |
| EP | 1433812 | 6/2004 |
| EP | 1676879 A2 | 7/2006 |
| EP | 2049590 | 4/2009 |
| JP | 2011001489 | 1/2011 |
| WO | 1995030698 | 11/1995 |
| WO | 2000026268 A1 | 5/2000 |
| WO | 2007136494 A2 | 11/2007 |
| WO | 2008016467 | 2/2008 |
| WO | 2011041230 | 4/2011 |
| WO | 2013090024 A1 | 6/2013 |
| WO | 2014084893 A1 | 6/2014 |
| WO | 2018119570 | 7/2018 |
| WO | 2019157688 A1 | 8/2019 |
| WO | 2019161013 | 8/2019 |

OTHER PUBLICATIONS

Brendan Rodgers Rubber Compounding (Year: 2015).*
Arjunan, "Compatibilzation of CR/EPM Blends for Power Transmission Belt Application," Rubber World, Feb. 1997.
Dick, "Rubber Technology: Compounding and Testing for Performance" 2009, Chapter 6, "Elastomer Selection," Hanser.
Dominic, "Overview of Automotive Wire and Cable and Recent Advances," ACS Rubber Division Spring Technical Meeting, 1998, Paper No. 32.
Ferradino, "Antioxidant Selection for Peroxide Cure Elastomer Applications", Rubber Chemistry and Technology, 2003, pp. 704, vol. 76.
Ohm, "Optimizing the Heat Resistance of EPDM and NBR," ACS Rubber Division Fall technical meeting, 2000, No. 99.
Sinha, "Cure, Antidegradant Use Better Hose, Belt Compounds," Rubber News, 2001, pp. 23-34, vol. 30, Issue 23.

(Continued)

Primary Examiner — Mark S Kaucher

(57) ABSTRACT

A first composition comprising a first ethylene/α-olefin/diene interpolymer and a second ethylene/α-olefin interpolymer, and wherein the first composition comprises from 0.1 to 1.0 wt % diene, based on the weight of the first composition, and wherein the first composition comprises from 40 to 70 wt % ethylene, based on the weight of the first composition.

13 Claims, No Drawings

(56) References Cited

OTHER PUBLICATIONS

Tao, "Heat Resistant Elastomers", Rubber Chemistry and Technology, 2005, pp. 489, vol. 78.
PCT/CN2018/076785 International Search Report dated Nov. 21, 2018.
PCT/CN2018/076785 Written Opinion of the International Searching Authority dated Nov. 22, 2018.
P. Arjunan et al, "Compatibilzation of CR/EPM Blends for Power Transmission Belt Application," Rubber World, (Feb. 1997).
EP18906185.6, European Search Report & Written Opinion, dated Jul. 28, 2021.

* cited by examiner

ETHYLENE/ALPHA-OLEFIN INTERPOLYMER COMPOSITIONS WITH IMPROVED LONG TERM HEAT AGING PERFORMANCE

BACKGROUND OF THE INVENTION

Ethylene-propylene ethylidene-nobornene (EPDM) rubbers are dominating hydrocarbon elastomers used in the manufacturing of cross-linked hoses, primarily used for automotive under the hood applications. Although EPDM rubbers are well known for their easy processing, weathering stability and water resistance, conventional automotive hoses, formed from the same, are still limited in the long term heat aging performance.

EPDM-based formulations are described in the following references: US2012/0116021; US2015/0274867; U.S. Pat Nos. 6,566,446; 6,686,419; 8,299,189; 9,234,093; 9,422,383; 9,580,587; EP0758346A1; EP101175B1; EP1433812A1; EP1676879A2; EP2049590A1; CA1334694C; WO2007/136494; WO2011/041230; International Application PCT/CN16/112090 filed Dec. 26, 2016; D.P. Sinha et al, "Cure, Antidegradant Use Better Hose, Belt Compounds," Rubber News (June, 2001); K. Dominic et al, "Overview of Automotive Wire and Cable and Recent Advances," ACS Rubber Division Spring Technical Meeting, 1998, Paper No. 32; "Rubber Technology: Compounding and Testing for Performance" by John Dick, Chapter 6, "Elastomer Selection," (2009, Hanser); Anthony G. Ferradino, Rubber Chemistry and Technology, Vol. 76, pp 704 (2003); P. Arjunan et al, "Compatibilzation of CR/EPM Blends for Power Transmission Belt Application," Rubber World, (February, 1997); Z. Tao, et al, "Heat Resistant Elastomers", Rubber Chemistry and Technology (2005, V 78, pp 489); R. Ohm, et al., "Optimizing the Heat Resistance of EPDM and NBR," ACS Rubber Division Fall technical meeting, 2000, Paper No. 99.

There is a need for EPDM rubbers that provide formulations with improved continuous upper temperature resistance with maintained mechanical properties, low temperature flexibility, and elastic recovery. This need has been met by the following invention.

SUMMARY OF THE INVENTION

A first composition comprising a first ethylene/α-olefin/diene interpolymer and a second ethylene/α-olefin polymer, and wherein the first composition comprises from 0.1 to 1.0 wt % diene, based on the weight of the first composition, and wherein the first composition comprises from 40 to 70 wt % ethylene, based on the weight of the first composition.

DETAILED DESCRIPTION

As discussed above, a first composition is provided that comprises a first ethylene/α-olefin/diene interpolymer and a second ethylene/α-olefin interpolymer; and wherein the first composition comprises from 0.1 to 1.0 wt % diene, or from 0.2 to 1.0 wt % diene, or from 0.3 to 1.0 wt %, based on the weight of the first composition; and wherein the first composition comprises from 40 to 70 wt % ethylene, based on the weight of the first composition.

It has been discovered that these first compositions can be readily crosslinked (for example, using sulfur and peroxide curing), and can be used to form formulations with excellent retention of mechanical properties after heat aging. Additional improvements include great low temperature flexibility and elasticity, high green strength and low iridescent which is to meet the unmet needs for automotive hoses applications.

A first composition may comprise a combination of two or more embodiments described here. The first ethylene/α-olefin/diene interpolymer may comprise a combination of two or more embodiments described here. The second ethylene/α-olefin interpolymer may comprise a combination of two or more embodiments described here.

In one embodiment, or a combination of embodiments described herein, the first interpolymer and the second interpolymer comprise ≥95 wt %, or ≥98 wt %, ≥99 wt % of the total weight of the first composition.

In one embodiment, the first ethylene/a-olefin/diene interpolymer has an Mw from 250,000 to 500,000 g/mole, and a diene content from 0.01 to 0.80 wt %, based on the weight of the first ethylene/α-olefin/diene interpolymer.

In one embodiment, or a combination of embodiments described herein, the first ethylene/α-olefin/diene interpolymer has a diene content from 0.20 to 0.80 wt %, or from 0.25 to 0.75 wt %, or from 0.30 to 0.70 wt %, or from 0.35 to 0.65 wt %, or from 0.40 to 0.60 wt %, based on the weight of the first ethylene/α-olefin/diene interpolymer.

In one embodiment, or a combination of embodiments described herein, the first ethylene/α-olefin/diene interpolymer has a C2 (polymerized ethylene) content from 55 to 80 wt %, or from 60 to 75 wt %, or from 65 to 70 wt %, based on the weight of the first ethylene/α-olefin/diene interpolymer.

In one embodiment, or a combination of embodiments described herein, the first ethylene/α-olefin/diene interpolymer has a weight average molecular weight (Mw) from 250,000 to 400,000 g/mole, or from 270,000 to 380,000 g/mole, or from 300,000 to 360,000 g/mole, or from 320,000 to 340,000 g/mole.

In one embodiment, or a combination of embodiments described herein, the first ethylene/α-olefin/diene interpolymer has a number average molecular weight (Mn) from 150,000 to 200,000 g/mole, or from 155,000 to 190,000 g/mole, or from 160,000 to 180,000 g/mole, or from 160,000 to 170,000 g/mole.

In one embodiment, or a combination of embodiments described herein, the first ethylene/α-olefin/diene interpolymer has a z average molecular weight (Mz) from 500,000 to 700,000 g/mole, or from 550,000 to 680,000 g/mole, or from 580,000 to 660,000 g/mole, or from 600,000 to 640,000 g/mole.

In one embodiment, or a combination of embodiments described herein, the first ethylene/α-olefin/diene interpolymer has a molecular weight distribution (Mw/Mn) from 1.70 to 2.40, or from 1.80 to 2.30, or from 1.90 to 2.20, or from 2.00 to 2.10.

In one embodiment, or a combination of embodiments described herein, the first ethylene/α-olefin/diene interpolymer has a Mooney Viscosity (ML1+4, 125° C.) from 80 to 100, or from 82 to 98 g/mole, or from 84 to 96 g/mole, or from 86 to 94 g/mole. Mooney viscosity is that of the first interpolymer without oil or filler unless otherwise noted.

In one embodiment, or a combination of embodiments described herein, the first ethylene/α-olefin/diene interpolymer has a melt viscosity V0.1 (0.1 rad/s, 190° C.) from 250,000 Pa·s to 650,000 Pa·s, or from 300,000 Pa·s to 600,000 Pa·s, or from 350,000 Pa·s to 550,000 Pa·s, or from 400,000 Pa·s to 500,000 Pa·s.

In one embodiment, or a combination of embodiments described herein, the first ethylene/α-olefin/diene interpolymer has a melt viscosity V100 (100 rad/s, 190° C.) from 8,000 Pa·s to 15,000 Pa·s, or from 9,000 Pa·s to 14,000 Pa·s, or from 10,000 Pa·s to 13,000 Pa·s, or from 11,000 Pa·s to 12,000 Pa·s.

In one embodiment, or a combination of embodiments described herein, the first ethylene/α-olefin/diene interpolymer has a rheology ratio (RR or V0.1N100) from 35 to 45, or from 36 to 42, or from 37 to 40.

In one embodiment, or a combination of embodiments described herein, the first ethylene/α-olefin/diene interpolymer is an EPDM.

In one embodiment, or a combination of embodiments described herein, the second ethylene/α-olefin interpolymer is an ethylene/α-olefin/diene interpolymer, and further an EPDM.

In one embodiment, or a combination of embodiments described herein, the first ethylene/α-olefin/diene interpolymer and the second ethylene/α-olefin interpolymer are each, independently, an EPDM.

In one embodiment, or a combination of embodiments described herein, the second ethylene/α-olefin interpolymer is selected from an ethylene/α-olefin copolymer, and further an ethylene/propylene copolymer; or an ethylene/α-olefin/diene interpolymer, and further an EPDM.

In one embodiment, or a combination of embodiments described herein, the first composition has an Mw from 150,000 to 400,000 g/mole, and a diene content from 0.01 to 0.50 wt %, based on the weight of the first composition. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a diene content from 0.10 to 0.80 wt %, or from 0.15 to 0.75 wt %, or from 0.20 to 0.70 wt %, or from 0.25 to 0.65 wt %, based on the weight of the first composition. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a C2 (polymerized ethylene) content from 40 to 65 wt %, or from 40 to 62 wt %, or from 40 to 60 wt %, based on the weight of the first composition. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a C2 (polymerized ethylene) content from 40 to 70 wt %, or from 42 to 62 wt %, or from 45 to 65 wt %, based on the weight of the first composition. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a weight average molecular weight (Mw) from 160,000 to 320,000 g/mole, or from 180,000 to 300,000 g/mole, or from 200,000 to 280,000 g/mole, or from 220,000 to 260,000 g/mole. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a number average molecular weight (Mn) from 84,000 to 120,000 g/mole, or from 86,000 to 100,000 g/mole, or from 88,000 to 98,000 g/mole, or from 90,000 to 96,000 g/mole. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a z average molecular weight (Mz) from 440,000 to 660,000 g/mole, or from 460,000 to 640,000 g/mole, or from 480,000 to 620,000 g/mole, or from 500,000 to 600,000 g/mole. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a molecular weight distribution (Mw/Mn) from 2.10 to 3.20, or from 2.20 to 3.00, or from 2.30 to 2.90, or from 2.40 to 2.80. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a Mooney Viscosity (ML1+4, 125° C.) from 70 to 90, or from 72 to 90, or from 74 to 88, or from 76 to 88 g/mole, or from 78 to 88 g/mole, or from 80 to 86 g/mole. Mooney viscosity is that of the first composition without oil or filler unless otherwise noted. In a further embodiment, the first composition comprises >95 wt %, or >98 wt %, or >99 wt % of the sum of the first interpolymer and the second interpolymer, based on the weight of the first composition.

In one embodiment, or a combination of embodiments described herein, the first composition has a melt viscosity V100 (100 rad/s, 190° C.) from 1,500 Pa·s to 7,500 Pa·s, or from 2,000 Pa·s, to 6,000 Pa·s, or from 2,500 Pa·s to 6,500 Pa·s, or from 3,000 Pa·s to 6,000 Pa·s. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a rheology ratio (RR or V0.1/V100) from 8.0 to 46, or from 10 to 44, or from 12 to 42. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a tan delta (190° C.) from 0.8 to 4.0, or from 1.0 to 3.8, or from 1.2 to 3.6. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a Tm from −15° C. to 55° C., or from −18° C. to 52° C., or from −20° C. to 50° C. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a Tm from 16° C. to 54° C., or from 18° C. to 52° C., or from 20° C. to 50°

C. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a Tg from −45° C. to −65° C., or from −50° C. to −60° C., or from −52° C. to −58° C., or from −54° C. to −56° C. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a % crystallinity ≤15%, or ≤12%, or ≤10%, or ≤8%, or ≤5%. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a % crystallinity from 0.5% to 15%, or from 0.5% to 12%, or from 0.5% to 10%. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the ratio of the diene content first composition to the diene content of the first ethylene/α-olefin/diene interpolymer is from 0.80 to 2.20, or from 0.90 to 2.10 from 1.00 to 2.00, or from 1.10 to 1.90, or from 1.20 to 1.80. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the ratio of the C2 (polymerized ethylene) content of the first composition to the C2 (polymerized ethylene) content of the first ethylene/α-olefin/diene interpolymer is from 0.50 to 1.10, or from 0.55 to 1.00, or from 0.60 to 0.90. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the ratio of the Mooney Viscosity (ML 1+4, 125° C.) of the first composition to the Mooney Viscosity (ML 1+4, 125° C.) of the first ethylene/α-olefin/diene interpolymer is from 0.75 to 1.05, or from 0.80 to 1.00, or from 0.85 to 0.95. Mooney viscosity is that of the first composition without oil or filler unless otherwise noted. Mooney viscosity is that of the first interpolymer without oil or filler unless otherwise noted. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the ratio of the Mw of the first composition to the Mw of the first ethylene/α-olefin/diene interpolymer is from 0.60 to 0.90, or from 0.65 to 0.85, or from 0.70 to 0.80. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the ratio of the Mn of the first composition to the Mn of the first ethylene/α-olefin/diene interpolymer is from 0.45 to 0.75, or from 0.50 to 0.70, or from 0.55 to 0.65. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the ratio of the Mz of the first composition to the Mz of the first ethylene/α-olefin/diene interpolymer is from 0.82 to 0.96, or from 0.84 to 0.97, or from 0.86 to 0.96. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the ratio of the MWD of the first composition to the MWD of the first ethylene/α-olefin/diene interpolymer is from 1.15 to 1.45, or from 1.20 to 1.40, or from 1.25 to 1.35. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the ratio of the V0.1 (0.1 rad/s, 190° C.) of the first composition to the V0.1 (0.1 rad/s, 190° C.) of the first ethylene/α-olefin/diene interpolymer is from 0.05 to 0.55, or from 0.10 to 0.50, or from 0.15 to 0.45. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition comprises from 30 to 40 wt % of the first ethylene/α-olefin/diene interpolymer, and further an EPDM. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition comprises from 60 to 70 wt % of the second ethylene/α-olefin interpolymer, and further an EPDM. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a density ≤0.890, or ≤0.880, or ≤0.875, or ≤0.870, or ≤0.865, or ≤0.860, g/cc. In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a "% Peak Area (from 21.3 to 22.0 ppm)" ≥5.0%, or ≥6.0%, or ≥7.0%, or ≥8.0%, or ≥9.0%, or ≥10%, or ≥11%, or ≥12%, or ≥13%, or ≥14%, or ≥15%, as determined by 13C NMR (propylene tacticity marker). In a further embodiment, the first composition comprises ≥95 wt %, or ≥98 wt %, or ≥99 wt % of the sum of the first interpolymer and the second interpolymer, based on the weight of the first composition.

In one embodiment, or a combination of embodiments described herein, the first composition has a "% Peak Area (from 21.3 to 22.0 ppm)" ≤40%, or ≤35%, or ≤30%, as determined by 13C NMR (propylene tacticity marker). In a further embodiment, the first composition comprises ≥95 wt %, or ≥98 wt %, or ≥99 wt % of the sum of the first interpolymer and the second interpolymer, based on the weight of the first composition.

Also is provided, a composition comprising the first composition of any one or more embodiments described herein, and an additive.

In one embodiment, or a combination of embodiments described herein, the additive is MgO, ZnO, or a combination thereof; and further MgO or ZnO; and further MgO. In a further embodiment, or a combination of embodiments described herein, the weight ratio of the first composition to the additive is from 2.0 to 8.0, or from 3.0 to 7.0, or from 4.0 to 6.0.

In one embodiment, or a combination of embodiments described herein, the first composition is present in an amount from 26 wt % to 42 wt %, or from 28 wt % to 40 wt %, or from 30 wt % to 38 wt %, of from 32 wt % to 36 wt %, based on the weight of the composition.

In one embodiment, or a combination of embodiments described herein, the MgO is present in an amount from 4.0 wt % to 10 wt %, or from 5.0 wt % to 9.0 wt %, or from 6.0 wt % to 8.0 wt %, based on the weight of the composition.

In one embodiment, or a combination of embodiments described herein, the additive is MgO, and the weight ratio of the first composition to the MgO is from 2.0 to 8.0, or from 3.0 to 7.0, or from 4.0 to 6.0.

In one embodiment, or a combination of embodiments described herein, the composition further comprises a curing agent, and further, the curing agent is a peroxide.

In one embodiment, or a combination of embodiments described herein, the curing agent (for example, a peroxide) is present in an amount from 2.0 wt % to 3.0 wt %, or from 2.2 wt % to 2.8 wt %, or from 2.4 wt % to 2.6 wt %, based on the weight of the composition.

In one embodiment, or a combination of embodiments described herein, the weight ratio of the Mg to the curing agent is from 2.2 to 3.2, or from 2.4 to 3.0, or from 2.6 to 2.8.

In one embodiment, or a combination of embodiments described herein, the composition further comprises a filler, and further the filler is carbon black.

In one embodiment, or a combination of embodiments described herein, the filler is present in an amount from 20 wt % to 36 wt %, or from 22 wt % to 34 wt %, or from 24 wt % to 32 wt %, based on the weight of the composition.

In one embodiment, or a combination of embodiments described herein, the weight ratio of the first composition to the filler is from 0.6 to 1.8, or from 0.8 to 1.6, or from 1.0 to 1.4.

In one embodiment, or a combination of embodiments described herein, the composition has an average Tensile Stress at Break ≥5.0 MPa, or ≥5.5 MPa, or ≥6.0 MPa, or ≥6.5 MPa, or ≥7.0 MPa, or ≥7.5 MPa.

In one embodiment, or a combination of embodiments described herein, the composition has an Elongation at Break ≥300%, or ≥320%, or ≥340%, or ≥360%, or ≥380%, or ≥400%.

In one embodiment, or a combination of embodiments described herein, the composition, after 1008 hours (6 weeks), at 150° C., in air, retains ≥50%, or ≥55%, or ≥60% of its original Tensile Strength, and retains ≥35%, or ≥40%, or ≥45%, of its original Elongation at Break.

In one embodiment, or a combination of embodiments described herein, the composition, after 1008 hours (6 weeks), at 150° C., in air, retains from 50% to 65% of its original Tensile Strength, and retains from 35% to 50% of its original Elongation at Break.

Also is provided, a crosslinked composition comprising the first composition of any one or more embodiments described herein.

Also is provided, a crosslinked composition comprising the composition of any one or more embodiments described herein.

A composition may comprise a combination of two or more embodiments as described herein.

Also is provided, an article comprising at least one component formed from the composition of any one or more embodiments described herein.

In one embodiment, or a combination of embodiments described herein, the article is selected from the group consisting of the following: injection molded parts, foams, automotive parts (i.e., hoses and belts, tires), building and construction materials, building and construction materials, and shoe components. In one embodiment, or a combination of embodiments described herein, the article is selected from the group consisting of the following: hoses, belts, and gaskets.

An article may comprise a combination of two or more embodiments as described herein.

The invention also provides a process for preparing the composition of one or more embodiment(s) described herein. In an embodiment, the process comprises polymerizing, in solution, at least the following: ethylene, an alpha-olefin (α-olefin), and a diene. In a further embodiment, the ethylene, the α-olefin and the diene are polymerized, in a continuous solution polymerization process, in two reactors.

Some embodiments are listed below.
  a) As discussed first composition comprising a first ethylene/α-olefin/diene interpolymer and a second ethylene/α-olefin interpolymer, and
  wherein the first composition comprises from 0.1 to 1.0 wt % diene, based on the weight of the first composition, and
  wherein the first composition comprises from 40 to 70 wt % ethylene, based on the weight of the first composition.
  b) The first composition of a) above, wherein the first ethylene/α-olefin/diene interpolymer has an Mw from 250,000 to 500,000 g/mole, and a diene content from 0.01 to 0.80 wt %, based on the weight of the first ethylene/α-olefin/diene interpolymer.
  c) The first composition of any one of a) or b) above, wherein the first ethylene/α-olefin/diene interpolymer is an EPDM.
  d) The first composition of any one of a)-c) above, wherein the first ethylene/α-olefin/diene interpolymer and the second ethylene/α-olefin interpolymer are each, independently, an EPDM.
  e) The first composition of any one of a)-d) above, wherein the first composition has an Mw from 150,000 to 400,000 g/mole, and a diene content from 0.01 to 0.50 wt %, based on the weight of the first composition.
  f) The first composition of any one of a)-e) above, wherein the first composition has a diene content from 0.10 to 0.80 wt %, or from 0.15 to 0.75 wt %, or from 0.20 to 0.70 wt %, or from 0.25 to 0.65 wt %, based on the weight of the first composition.
  g) The first composition of any one of a)-f) above, wherein first composition has a C2 (polymerized ethylene) content from 40 to 70 wt %, or from 42 to 62 wt %, or from 45 to 65 wt %, based on the weight of the first composition.
  h) The first composition of any one of a)-g) above, wherein first composition has a molecular weight distribution (Mw/Mn) from 2.10 to 3.20, or from 2.20 to 3.00, or from 2.30 to 2.90, or from 2.40 to 2.80.

i) The first composition of any one of a)-h) above, wherein first composition has a Mooney Viscosity (ML1+4, 125° C.) from 72 to 90, or from 74 to 88, or from 76 to 86 g/mole, or from 78 to 88 g/mole, or from 80 to 86 g/mole.
j) The first composition of any one of a)-i) above, wherein the first composition has a % crystallinity ≤15%, or ≤10%, or ≤5%.
k) The first composition of any one of a)-j) above, wherein the ratio of the Mooney Viscosity (ML 1+4, 125° C.) of the first composition to the Mooney Viscosity (ML 1+4, 125° C.) of the first ethylene/α-olefin/diene interpolymer is from 0.75 to 1.05, or from 0.80 to 1.00, or from 0.85 to 0.95.
l) The first composition of any of a)-k) above, wherein the first interpolymer and the second interpolymer comprise ≥95 wt %, or ≥98 wt %, ≥99 wt % of the total weight of the first composition.
m) The first composition of any of a)-1) above, wherein the first composition has a "% Peak Area (from 21.3 to 22.0 ppm)" ≥5.0, or ≥6.0, or ≥7.0, or ≥8.0, or ≥9.0, or ≥10, or ≥11, or ≥12, or ≥13, or ≥14, or ≥15, as determined by 13C NMR (propylene tacticity marker).
n) A composition comprising the first composition of any one a)-m) above, and an additive.
o) The composition of n) above, wherein the additive is MgO or ZnO, and further MgO.
p) The composition of n) or o) above, wherein the first composition is present in an amount from 26 wt % to 42 wt %, or from 28 wt % to 40 wt %, or from 30 wt % to 38 wt %, or from 32 wt % to 36 wt %, based on the weight of the composition.
q) The composition of any one of a)-p) above, wherein the weight ratio of the first composition to the additive (for example, MgO) is from 2.0 to 8.0, or from 3.0 to 7.0, or from 4.0 to 6.0.
r) The composition of any of a)-q) above, wherein the composition, after 1008 hours (6 weeks), at 150° C., in air, retains ≥50%, or ≥55%, or ≥60% of its original Tensile Strength, and retains ≥35%, or ≥40%, or ≥45%, of its original Elongation at Break.
s) The composition of any of a)-r) above, wherein the composition, after 1008 hours (6 weeks), at 150° C., in air, retains from 50% to 65% of its original Tensile Strength, and retains from 35% to 50% of its original Elongation at Break.
t) The composition of any one of a)-r) above, wherein the composition, comprises ≤0.50 wt %, or ≤0.10 wt %, or ≤0.05 wt %, or ≤0.01 wt % of a propylene-based polymer comprising a majority amount of polymerized propylene, based on the weight of the polymer. In a further embodiment, the composition does not comprise a propylene-based polymer.
u) A crosslinked composition comprising the composition of any one of a)-t) above
v) An article comprising at least one component formed from the composition of anyone of a)-u) above.

Ethylene/α-Olefin/Diene Interpolymers

The first composition comprises a first ethylene/α-olefin/diene interpolymer. In a preferred embodiment, the second ethylene/α-olefin interpolymer is independently an ethylene/α-olefin/diene interpolymer.

Each ethylene/α-olefin/diene interpolymer, independently comprises, in polymerized form, ethylene, an α-olefin, and a diene. The α-olefin may be either an aliphatic or an aromatic compound. In an embodiment, the α-olefin is a $C_3$-$C_{20}$ aliphatic compound, preferably a $C_3$-$C_{16}$ aliphatic compound, and more preferably a $C_3$-$C_{10}$ aliphatic compound. Preferred $C_3$-$C_{10}$ aliphatic α-olefins are selected from the group consisting of propylene, 1-butene, 1-hexene and 1-octene, and more preferably propylene.

Suitable examples of dienes include the $C_4$-$C_{40}$ nonconjugated dienes. Illustrative nonconjugated dienes include straight chain acyclic dienes such as 1,4-hexadiene and 1,5-heptadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetra-hydroindene, methyl tetrahydroindene; alkenyl, alkylidene, cycloalkenyl and cycloalkyli-dene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. In an embodiment, the diene is a nonconjugated diene selected from the group consisting of ENB, dicyclo-pentadiene, 1,4-hexadiene, 7-methyl-1,6-octadiene. In embodiments, the diene is ENB.

In one embodiment, or a combination of embodiments described herein, each ethylene/α-olefin/diene interpolymer is an ethylene/α-olefin/diene terpolymer (EAODM). In a further embodiment, the interpolymer is an ethylene/propylene/diene terpolymer (EPDM) terpolymer. In a further embodiment, the diene is 5-ethylidene-2-norbornene (ENB).

In one embodiment, or a combination of embodiments described herein, the diene is selected from 5-vinyl-2-norbornene (VNB). 1,5-Hexadiene (HD), dicyclopentadiene (DCPD), or 5-ethylidene-2-norbornene (ENB).

An ethylene/α-olefin/nonconjugated diene interpolymer may comprise a combination of two or more embodiments described herein. An EPDM terpolymer may comprise a combination of two or more embodiments as described herein.

In one embodiment, or a combination of embodiments described herein, the sum weight of the first ethylene/α-olefin/diene interpolymer and the second ethylene/α-olefin/diene interpolymer is ≥95 wt %, or ≥96 wt %, or ≥97 wt %, or ≥98 wt %, or ≥99 wt %, based on the weight of the first composition.

In one embodiment, the first composition has a density of ≤0.890, or ≤0.880, or ≤0.875, or ≤0.870, or ≤0.865, or ≤0.860 g/cc. In one embodiment, the first composition has a density of ≥0.850 g/cc. or ≥0.855 g/cc (1 cc=1 cm3).

In one embodiment, the first composition has a weight ratio of the first interpolymer to the second interpolymer is from 20/80 to 40/60, or from 25/75 to 40/60, or from 30/70 to 40/60.

The first composition may comprise a combination of two or more embodiments described herein.

Additives and Applications

A composition may comprise one or more additives, such as oils, crosslinking (or vulcanizing) agents, fillers, antioxidants, flame retardants, foaming agents, colorants or pigments, and thermoplastic polymers, among others.

In an embodiment, the oil is selected from the group consisting of nonaromatic oils, paraffinic oils, naphthenic oils, and combinations thereof. Suitable oils include, but are not limited to, SUNPAR 2280, PARALUX 6001, HYDROBRITE 550, and CALSOL 5550. An oil may comprise a combination of two or more embodiments as described herein.

Illustrative crosslinking/vulcanizing agents include, but are not limited to sulfur-containing compounds, such as elemental sulfur, 4,4'-dithiodimorpholine, thiuram di-and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; azo-compounds; silanes, such as vinyl tri-ethoxy or vinyl tri-methoxy silane; dinitroso compounds, such as p-quinone-dioxime and p,p'-dibenzoylquinone-dioxime; phenol-formaldehyde resins containing hydroxymethyl or halomethyl functional groups; and other types of radical generators (e.g. N—O break type and C—C break type), among others. The suitability of any of these crosslinking/vulcanizing agents for use in the invention is well known to those skilled in the compounding arts. In an embodiment, the crosslinking/vulcanizing agent comprises a sulfur-containing compound.

Additional additives include, but are not limited to, fillers, flame retardants, colorants or pigments, thermoplastic polymers, and combinations thereof. Such additives can be employed in a desired amount to achieve their desired effect. Suitable fillers include, but are not limited to, clay, talc, or carbon black.

In one embodiment, or a combination of embodiments described herein, the inventive composition further comprises at least one antioxidant. Illustrative antioxidants include, but are not limited to, peroxy and alkoxy radical traps (amines and hindered phenols), hydroperoxide decomposers, and synergist.

In one embodiment, or a combination of embodiments described herein, an inventive composition further comprises a thermoplastic polymer. Illustrative polymers, include, but not limited to, propylene-based polymers, ethylene-based polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

The compositions of the present invention may be used to prepare a variety of articles, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes. Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation. The inventive compositions are especially suitable for use as hose for automotive coolant hose. For example, an inventive composition can be used for an engine coolant hose.

DEFINITIONS

Unless stated to the contrary, implicit from the context, or customary in the art, all parts and percents are based on weight, and all test methods are current as of the filing date of this disclosure.

The term "composition" and like terms, as used herein, means a mixture or blend of two or more materials which comprise the composition, as well as reaction products and decomposition products formed from the materials of the composition.

The transitions (or terms) "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts or impurities, such as catalyst residues, can be incorporated into and/or within the polymer.

The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers (e.g., terpolymers (three different monomer types) and tetrapolymers (four different monomer types)).

The term "ethylene-based polymer" and like terms, as used herein, refers to a polymer that comprises, in polymerized form, 50 wt % or a majority weight percent of ethylene monomer (based on the weight of the polymer), and optionally may comprise one or more comonomers.

"Ethylene/α-olefin/diene interpolymer" and like terms, as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

"Ethylene/α-olefin interpolymer" and like terms, as used herein, refers to a polymer that comprises, in polymerized form, ethylene, and an α-olefin, and optionally, another comonomer. In a preferred embodiment, the "ethylene/α-olefin interpolymer" is an ethylene/α-olefin/diene interpolymer.

"Ethylene/α-olefin copolymer" and like terms, as used herein, refers to a copolymer that comprises, in polymerized form, 50 wt % or a majority of ethylene, based on the weight of the copolymer, and an a-olefin as the only monomer types.

TEST METHODS

Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000 g/mole, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: Mpolyethylene=A×(Mpolystyrene)B, where M is the molecular weight, A has a value of 0.431 and B is equal to 1.0 (as described in Williams and Ward, J. Polym. Sc., Polym. Let., 6, 621 (1968)). Polyethylene equivalent molecular weight calculations were performed using Viscotek TriSEC software Version 3.0.

13C NMR Method for EPDM Composition Analysis

The samples were prepared by adding approximately "2.6 g" of a "50/50 mixture of tetrachloroethane-d2/orthodichlorobenzene" that is "0.025 M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points. NMR spectral analysis of each composition of the examples was carried out using the following analysis method.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes. The rheology ratio (V0.1/V100 at 190° C.; also referred to as "RR") was recorded. A linear molecule (no detectable long chain branching) typically has a RR of 8 or less.

Differential Scanning Calorimetry (DSC)

Differential Scanning calorimetry (DSC) is used to measure crystallinity in ethylene-based (PE) samples (including EPDM) and propylene-based (PP) samples. Sample (0.5 g) sample was compression molded into a film, at 5000 psi, 190° C., for two minutes. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −90° C. for PE (−90° C. for PP), and kept isothermally at that temperature for three minutes. The sample is next heated at a rate of 10° C./min, until complete melting (second heat). The percent crystallinity is calculated by dividing the heat of fusion (Ill), determined from the second heat curve, by a theoretical heat of fusion of 292 J/g for PE (165 J/g, for PP), and multiplying this quantity by 100 (for example, % cryst.=(Hf/292 J/g)×100 (for PE)). Unless otherwise stated, melting point(s) (Tm) of each polymer is determined from the second heat curve, and the crystallization temperature (Tc) is determined from the first cooling curve.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000. The viscosity of each formulated compositions was measured using an uncured blanket (see experimental section), so that the viscosity of the uncured composition could be examined. Samples were conditioned for 24 hours at room temperature, prior to testing.

Mooney Scorch

Scorch properties of each composition was measured in accordance to ASTM D-1646, using an Alpha Technologies Mooney Viscometer 2000. Mooney viscometer was set at 125° C. The Mooney scorch values were reported for a small rotor, and represented the time to rise "x Mooney units" above the minimum viscosity (e.g. t5 is a "five Mooney unit" increase in viscosity). The total test time was 30 minutes, with a 1 minute preheat time. The viscosity of the compositions were measured from uncured blanket, cured in the viscometer, so that the scorch properties could be examined. Samples were conditioned for 24 hours at room temperature, prior to testing.

MDR Analysis

MDR cure properties of each formulation were measured in accordance to ASTM D-3182, using an Alpha Technologies Rheometer MDR 2000. The MDR Test was carried out at 160° C. over a period of 30 minutes. The rheology of each formulated composition was measured from samples of uncured blanket, which was then cured during the MDR analysis. Samples were conditioned for 24 hours at room temperature, prior to testing. The visco-elastic properties, such as Mooney low, Mooney high, tan delta low, tan delta high, and time to reach a certain percentage of the cure state (for example, t95 corresponds to the time in minutes to reach the 95% state of cure), were measured during the cure cycle.

FTIR Method for EPDM Composition Analysis

The terpolymers containing ethylene, propylene, and 5-ethylidene-2-norbornene were analyzed using ASTM D3900 for its ethylene content, and ASTM D6047 for its ethylidene-norbornene or dicyclopentadiene content.

13C NMR Method for EPDM Composition Analysis and Tacticity (% mm)

The samples were prepared by adding approximately "2.6 g" of a "50/50 mixture of tetrachloroethane-d2/orthodichlorobenzene" that is "0.025 M" in chromium acetylacetonate (relaxation agent) to "0.2 g sample" in a 10 mm NMR tube.

The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points.

NMR spectral analysis of each composition of the examples was carried out using the following analysis method. Quantitation of monomers present in EPDM can also be calculated using the following equations (1 through 9). The calculation of moles ethylene normalizes the spectral range from 55.0 to 5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3*molesP - 7*molesENB)}{2} \quad \text{Eqn. 1}$$

$$molesENB = CH3(13.6 - 14.7 \ ppm) \quad \text{Eqn. 2}$$

$$molesP = CH3(19.5 - 22.0 \ ppm) \quad \text{Eqn. 3}$$

$$mole\%ethylene = \frac{(100*molesE)}{molesE + molesP + molesENB} \quad \text{Eqn. 4}$$

$$mole\%propylene = \frac{(100*molesP)}{molesE + molesP + molesENB} \quad \text{Eqn. 5}$$

$$mole\%ENB = \frac{(100*molesENB)}{molesE + molesP + molesENB} \quad \text{Eqn. 6}$$

$$Wt\%ethylene = \frac{(100*mole\%E*28)}{mole\%E*28 + mole\%P*42 + mole\%ENB*120} \quad \text{Eqn. 7}$$

$$Wt\%propylene = \frac{(100*mole\%P*42)}{mole\%E*28 + mole\%P*42 + mole\%ENB*120} \quad \text{Eqn. 8}$$

$$Wt\%ENB = \frac{(100*mole\%E*120)}{mole\%E*28 + mole\%P*42 + mole\%ENB*120} \quad \text{Eqn. 9}$$

Propylene Tacticity % mm Area 13C NMR

The 13C NMR spectral analysis of the EPDM samples was used to quantitate the level of tacticity % mm. The NMR was performed in a "50/50 mixture of tetrachloroethane-d2/orthodichlorobenzene," as described above. An NMR spectral analysis (see above) of the inventive EPDMs displayed a significant "% peak area from 21.3 ppm-22.0 ppm [rmmr, mmmr, mmmm]," typically greater than 3.5% of the total integral area from 19.5 ppm to 22.0 ppm. Peak responses in this region typically are related to differences in propylene tacticity (% mm) that have been incorporated into the EPDM. A similar analysis can be done for another type of ethylene/α-olefin/diene interpolymer. Spectral data were referenced to the EEE backbone (three or more repeating units of polymerized ethylene) at 30 ppm.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and beginning of the test, was set to five minutes for all samples. The experiments were performed at 190° C., over a frequency range from 0.1 to 100 rad/s. The strain amplitude was adjusted, based upon the response of the samples, from 1 to 3%. The stress response was analyzed in terms of amplitude and phase, from which the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platents (15-20° C.) for two minutes. The rheology ratio of the viscosity at 0.1 rad/sec to the viscosity at 100 rad/sec (V0.1/V100 at 190° C.; also referred to as "RR") was recorded. A linear molecule (no detectable long chain branching) typically has a RR of 8 or less. It is acknowledged that the presence oil in the polymer can decrease the observed RR, so the following equation was used to estimate the RR of a polymer (RRPolymer) from the RR value of a polymer containing oil (RROE_Polymer):

$$RRPolymer = RROE\_Polymer/(wt \% \ oil*(-0.01988) + 1.0321).$$

Compression Set

Compression set was measured according to ASTM D395 at 23° C. and 100° C. Disks of "29mm (±0.5mm)" in diameter and "12.7 (±0.5mm)" thickness were punched from compression molded plaques, prepared as described under the section of compression molding (see Experimental section). Each button sample was inspected for notches, uneven thickness and inhomogeneity, and selected buttons (without those defects) were tested. Compression set was performed on two specimens for each sample, at the temperatures specified, and the average of the two specimens reported. The button sample was placed in the compressive device having two metal plates, which could be pressed together, and locked into place at 75% of the original height of the button sample. The compressive device, with the compressed samples, was then placed in an oven, and equilibrated at the appropriate temperature for a specified time (22 hrs at 23° C. or 100° C.). In this test, the stress was released at the test temperature, and the thickness of the sample was measured after 30 minute equilibration period at room temperature. Compression set is a measured of the degree of recovery of a sample following compression, and is calculated according to the equation $CS=(H_0-H_2)/(H_0-H_1)$; where $H_0$ is the original thickness of the sample, $H_1$ is the thickness of the spacer bar used, and $H_2$ is the final thickness of the sample after removal of the compressive force.

Tensile Stress-Strain Properties

Tensile properties were measured using specimens which were die cut using a small dog bone shaped micro tensile die, having the dimensions described in ASTM D-1708. The die cut specimens were cut from the compression molded plaques which were prepared as described under the compression molding section (see the Experimental section). Tensile properties (tensile strength and elongation) were measured, at room temperature, following the method ASTM D-412, in the machine direction of an INSTRON MODEL 1122, made by INSTRU-MET.

EXPERIMENTAL

Representative Synthesis of First Composition-Continuous Polymerization

The polymerization reaction was performed under steady state conditions, that is, constant reactant concentration and continual input of solvent, monomers, and catalyst, and constant withdrawal of unreacted monomers, solvent and polymer. The reactor system was cooled and pressurized to prevent formation of a vapor phase. Monomers: ethylene (CAS 74-85-1); propylene (CAS 115-07-1); 5-ethylidene-2-norbornene, ENB (CAS 16219-75-3).

The polymer composition was produced in a solution polymerization process using a continuous stir-tanked reactor followed by loop reactor. Ethylene was introduced in a mixture of a solvent of ISOPAR E (available from Exxon-Mobil), propylene was introduced and 5-ethylidene-2-norbornene (ENB) was introduced, each forming a reactor feed stream. Catalyst was fed to each the reactor separately, and activated in-situ using co-catalyst 1 and co-catalyst 2. The outlet of each reactor was consequently a mixture of polymer, solvent, and reduced levels of the initial monomers. The outlet of the first reactor was fed directly into the second reactor (unless otherwise sampled). The molecular weight of the polymer was controlled by adjusting each reactor's temperature, monomer conversion and/or the addition of a chain terminating agent, such as hydrogen.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate. See also U.S. Pat. Nos. 5,977,251 and 6,545,088 for further descriptions of the polymerization reactors. Monomer feed rate and polymerization temperature and other conditions are listed in below in Table 1 and Table 2. Properties of the first composition are shown in Table 3.

TABLE 1

Reaction Conditions

| Example | Reactor Temp. [degC] | Pressure [psig] | Solvent/ Ethylene Feed Ratio[lb/lb] | Propylene/ Ethylene Feed Ratio [lb/lb] | ENB/ Ethylene Feed Ratio [lb/lb] |
|---|---|---|---|---|---|
| EPDM01-R1 (first reactor) | 125.7 | 750 | 10.3 | 0.99 | 0.04 |
| EPDM01 (second reactor) | 125.0 | 725 | 6.29 | 1.63 | 0.01 |
| EPDM02-R1 (first reactor) | 141.7 | 737 | 9.56 | 1.00 | 0.02 |
| EPDM02 (second reactor) | 139.9 | 726 | 13.4 | 0.40 | 0.01 |

TABLE 2

Reaction Conditions

| Example | Catalyst | H2 mol % | C2 Conc. [g/L] | Catalyst Efficiency [lb_poly/ b_metal]*10E6 | Borate/Cat. Metal Ratio [mol/mol] | Aluminum/Cat. Metal Ratio [mol/mol] |
|---|---|---|---|---|---|---|
| EPDM01-R1 (first reactor) | Catalyst-1 | 0.11 | 23.0 | 12.8 | 1.9 | 32.3 |
| EPDM01 (second reactor) | Catalyst-1 | 0.20 | 10.3 | 13.8 | 2.0 | 5.1 |
| EPDM02-R1 (first reactor) | Catalyst-2 | 0.01 | 22.2 | 0.84 | 2.0 | 9.9 |
| EPDM02 (second reactor) | Catalyst-2 | 2.17 | 6.2 | 0.59 | 2.0 | 10.0 |

Catalyst-1 is [[6',6'''-((2R,4S)-pentane-2,4-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol)]](2-)]-zirconium dimethyl.
Catalyst-2 is [[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafnium dimethyl.
Cocatalyst-1 was a mixture of methyldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[B(C6F5)4], substantially as disclosed in U.S. Pat. No. 5,919,988 (Ex. 2).
Cocatalyst-2 (modified methylalumoxane (MMAO)) was purchased from Akzo Nobel, and used without further purification.

As see in Table 3, EPDM 01 and EPDM 02 has a lower ENB, as compared with NORDEL 4570 and with NORDEL 4770. Each inventive EPDM composition also contains an EPDM that has an unexpectedly high amount of propylene tacticity, as indicated by the significant "% NMR peak area from 21.3 to 22.0 ppm," as it relates to % mm (meso diads) tacticity in the EPDM.

TABLE 3

Property Data for Comparative and Inventive EPDM

| First Composition | | Units | NORDEL 4570 | NORDEL 4770 | First reactor | EPDM01 (second reactor) Second reactor (final polymer composition) | EPDM02 (second reactor) Second reactor (final polymer composition) |
|---|---|---|---|---|---|---|---|
| | wt %* C2 | | 50.2 | 70.8 | 68.7 | 61.2 | 46.8 |
| | wt %* C3 | | 44.9 | 24.3 | 30.7 | 38.2 | 52.91 |
| | wt %* ENB | | 4.9 | 4.9 | 0.52 | 0.60 | 0.28 |
| Amount of first reactor component | wt %** | | | | 35 | 65 | |

TABLE 3-continued

Property Data for Comparative and Inventive EPDM

| First Composition | | Units | NORDEL 4570 | NORDEL 4770 | First reactor | EPDM01 (second reactor) Second reactor (final polymer composition) | EPDM02 (second reactor) Second reactor (final polymer composition) |
|---|---|---|---|---|---|---|---|
| Polymer MOONEY | ML (1 + 4) 125° C. | MU | 71 | 70 | 89.7 | 85.4 | 80 |
| CONV. GPC | Mn | g/mol | 76191 | 64477 | 161822 | 93525 | 93520 |
| | Mw | g/mol | 198581 | 174511 | 333834 | 236848 | 255029 |
| | Mz | g/mol | 400146 | 366401 | 609869 | 534591 | 577503 |
| | Mw/Mn | | 2.61 | 2.71 | 2.06 | 2.53 | 2.73 |
| Viscosity at 0.1 rad/s | V (0.1, 190° C.) | Pa-s | 119000 | 146000 | 450056 | 72896 | 179920 |
| Viscosity at 100 rad/s | V (100, 190° C.) | Pa-s | 3973 | 4874 | 11737 | 5154 | 4464 |
| Rheology Ratio | RR V0.1/V100 | | 29.8 | 29.9 | 38.34 | 14.1 | 40.30 |
| Tan Delta | | 190° C. | | | | 3.50 | 1.31 |
| % Peak Area*** 21.3-22.0 ppm | | % | | | | 15.1 | 18.1 |
| Tm | DSC | ° C. | | | | 49 | −20 |
| Tg | DSC | ° C. | | | | −54 | −53 |
| Delta H (fusion) | DSC | J/g | | | | 27.4 | 5.0 |

*For each interpolymer, the wt % based on the weight of the interpolymer; for each first composition, the wt % based on the weight of the first composition.
**The wt % based on weight of second (final) reactor product.
***% Peak Area = {[(area from 21.3 ppm to 22.0 ppm)/(total integral area from 19.5 ppm to 22.0 ppm)] × 100}; as determined by 13C NMR described herein.

Formulations (Inventive and Comparative Compositions)

Raw materials and test formulations for inventive and comparative examples are listed in Table 4 and Table 5, respectively.

TABLE 4

Raw Materials used in Test Formulations (Compositions)

| | Chemical Composition | Source | Function |
|---|---|---|---|
| Nordel 4570 4.9% ENB | EPDM | Dow | Polymer |
| Nordel 4770 4.9% ENB | EPDM | Dow | Polymer |
| EPDM01 0.60% ENB | EPDM | Dow | Polymer |
| EPDM02 0.28% ENB | EPDM | Dow | Polymer |
| MAGLITE D | MgO | (HallStar Company) | Acid acceptor |
| SUNPAR 2280 | Paraffinic Oil | (HollyFrontier) | oil |
| OMYA 2T-FL | CALCIUM CARBONATE | OMYA | Filler |
| C.B. N660 | CARBON BLACK | Cabot | Reinforcing Filler |
| VULCUP 40KE | di-(tert-butylperoxyisopropyl)benzene | Arkema | Peroxide curing agent |
| SARET SR 517 HPD | | Sartomer | Curing coagent |
| VANOX CDPA | 4, 4'-Bis (alpha, alpha-dimethylbenzyl) diphenylamine | RT Vanderbilt | Primary AO |
| VANOX MTI | 2-mercaptotoluimidazole | RT Vanderbilt | Synergist AO |

TABLE 5

Formulations (Compositions)

| | Inv-1 | Inv-2 | Comp-A |
|---|---|---|---|
| NORDEL 4570 | | | 40 |
| NORDEL 4770 | | | 60 |
| EPDM01 0.60% ENB | 100 | | |
| EPDM02 0.28% ENB | | 100 | |
| MAGLITE D | 20 | 20 | 20 |
| SUNPAR 2280 | 55 | 55 | 55 |
| OMYA 2T-FL | 20 | 20 | 20 |
| C.B. N660 | 84 | 84 | 84 |
| VULCUP 40KE | 7.5 | 7.5 | 7.5 |
| SARET SR 517 HPD | 6 | 6 | 6 |
| VANOX CDPA | 1 | 1 | 1 |
| VANOX MTI | 2 | 2 | 2 |
| Total (weight parts) | 295.5 | 295.5 | 295.5 |

Compounding and Mixing

Each formulation (composition) was mixed in a rubber internal mixer, i.e., Banbury lab mixer BR 1600 (batch mixer), in accordance to ASTM D 3182. The mixer was equipped with a pair of 2-wing rotors. The batch weight was sized to a 75 vol % fill factor in the mixer bowl. The rotor speed was kept constant at 50 rpm during the mixing cycle (approximately 5 minutes total mixing time). A thermocouple was used to measure the melt temperature of the mixture. A standard "up-side down" mixing procedure was used, with (carbon black, $CaCO_3$, MAGLITE D, VANOX CDPA, and VANOX MTI) added first; followed by oil (SUNPAR 2280), charged into the mixing bowl, and the first composition (EPDM or EPDM blend) was added last. When the temperature of the mixture reach 85° C., the peroxide curative system (VULCUP 40KE, SARET SR 517 HP) were next added, into the mix. Once the melt temperature reached 105° C., the final compounded mixture was dropped into a catch pan. The mixture was transferred to a Reliable six inch, two roll mill. Mixing was completed on the two roll mill at ambient conditions, by cigar-rolling the compound batch five times through the two roll mill, to form a compound sheet. Each compound sheet (uncured) had a thickness of about 0.09 inch.

Properties of the Formulations (Rheology and Mechanical)

Mooney Viscosity

The Mooney viscosity of each formulated composition was measured using a sample take from an uncured compound sheet, so that the viscosity of the uncured composition could be examined. Mooney Viscosity (ML1+4 at 100° C.) was measured in accordance with ASTM 1646, with a one minute preheat time and a four minutes rotor operation time. The instrument is an Alpha Technologies Mooney Viscometer 2000.

MDR Analysis

The cure kinetic profiles of each formulation (composition) at 180° C. was measured using an Alpha Technology Moving Die Rheometer (MDR), in accordance with ASTM D5289. The MDR test was carried out at 180° C., over a period of 30 minutes. The rheology or curve of torque, as a function of time, for each formulated composition was measured from samples of a uncured sheet at a temperature of 180° C., and the curing profile as a function of time (at 180° C.) was examined. The viscoelastic properties, such as minimum S' torque (ML), maximum S' torque (MH; or 100% cure), and time to reach a certain percentage of the cure state (for example, t95, which corresponds to the time, in minutes, to reach the 95% state of cure), were measured during the cure cycle. See Table 6.

TABLE 6

Compound Properties of Fourth set of formulations

|  | Inv-1 | Inv-2 | Comp-A |
| --- | --- | --- | --- |
| ML(1 + 4) [MU] | 81.4 | 80.4 | 68.8 |
| MDR |  |  |  |
| ML [dNm] | 2.35 | 2.66 | 1.90 |
| MH [dNm] | 15.63 | 13.78 | 18.37 |
| dS' [dNm] | 13.29 | 11.12 | 16.47 |
| ts1 [min] | 0.39 | 0.42 | 0.42 |
| ts2 [min] | 0.53 | 0.60 | 0.56 |
| t10 [min] | 0.44 | 0.44 | 0.51 |
| t50 [min] | 1.24 | 1.26 | 1.38 |
| t90 [min] | 3.02 | 2.81 | 4.05 |
| t95 [min] | 4.10 | 3.61 | 5.52 |

Compression Molded Plaques (6 in×6 in×0.077 in)

The mechanical properties of each formulation was measured from the vulcanized sheets, cured in a compression molder (for tensile, and shore A hardness). Samples from the uncured compound sheet were each cut out slightly smaller than 6×6 inches, depending on the thickness of the sheet. The slab weight will depend on the specific gravity of the compound. The mill direction was marked, and the sample was labeled. The mold was spray brushed with Camie 999 Dry Silicone Spray from Camie-Campbell. The mold (6 in.×6 in×0.077 in) was placed on a platen. The sample was carefully placed in the mold preheated at a temperature of 180° C. The platens were closed. To vulcanize the samples, the samples were under a minimum compression pressure of 3.5 MPa (500 psi) at 180° C. using the "t95 data plus 3 minutes" for plaques. When cure time ended (t95 data plus 3 minutes), the bottom platen automatically opened. The sample, in the mold, was removed, and immediately placed in water (room temperature) to stop the curing. Each cured sample was removed from the mold, and conditioned for at least 18 hours, in air, at room temperature, prior to testing.

Vulcanizates Physical Properties (Original and Aged Samples)

After curing, cured specimens/vulcanizates were conditioned for at least 18 hours, at ambient conditions before testing. Properties are listed in Tables 4, 5A, 5B and 5C below.

Tensile Stress-Strain Properties

Original tensile properties were measured using specimens which were die cut from the cured plague, as described above, using a "dumbbell" shaped tensile die, having the dimensions described in ASTM D-412. Three die cut specimens were cut from one plaque.

For heat aged tensile properties measurement, the test specimens were first die cut from the cured plague, as described above, using a "dumbbell" shaped tensile die, having the dimensions described in ASTM D-412. Those fabricated test specimens were then aged in the air ventilated oven at 150° C., at the desired aging hours. The heat aged tensile properties were then measured using those heat aged test specimens. Tensile properties (tensile strength and elongation) were measured at room temperature, following the method ASTM D-412 and ASTM D-573.

Shore A Hardness Properties

Shore A hardness properties were measured using a stacked of three die cut specimens (dumbbell), each having the dimensions described in ASTM D-412. Three die cut specimens were cut from the compression molded plaque, which were prepared as described above. Shore A hardness properties were measured at room temperature, following the method ASTM D-2240.

TABLE 7

Original Physical Properties of Vulcanizates of fourth set formulations

|  | Inv-1 | Inv-2 | Comp-A |
| --- | --- | --- | --- |
| Tensile Stress @ 50% Strain (MPa) | 1.8 | 1.1 | 1.6 |
| Tensile Stress @ 100% Strain (MPa) | 2.7 | 1.7 | 2.3 |
| Tensile Stress @ 300% Strain (MPa) | 7.5 | 5.6 | 5.5 |
| Elongation At Break (%) | 366 | 413 | 339 |
| Tensile Strength (MPa) | 8.7 | 7.6 | 12.6 |
| Shore A Hardness | 68 | 60 | 72 |

Heat Aging Properties of Vulcanizates are shown in Table 8 below. As seen in this table, the ntive compositions have good mechanical properties, and show superior long term heat aging properties, as compared to the comparative composition. Also, Inventive 1 and 2 sample show, respectively, an 8 and 9 "Shore A unit" increase after aging at 150° C., in air, for 1008 hours, while comparative example shows 14 unit increase.

TABLE 8

Heat Aging Properties

| | | Inv-1 | Inv-2 | Comp-A |
|---|---|---|---|---|
| Shore A Hardness | 0 hours | 68 | 60 | 72 |
| | 168 hours | 69 | 65 | 74 |
| | 1008 hours | 76 | 69 | 86 |
| Tensile Strength (TS) retention (%) | 0 hours | 100% | 100% | 100% |
| | 96 hours | 93% | 102% | 96% |
| | 168 hours | 101% | 100% | 100% |
| | 238 hours | | | 93% |
| | 305 hours | 91% | 89% | |
| | 336 hours | | | 85% |
| | 504 hours | 85% | 84% | |
| | 762 hours | 75% | 72% | |
| | 1008 hours | 66% | 62% | 53% |
| Tensile Strength. (MPa) | 0 hours (original) | 8.7 | 7.6 | 12.6 |
| | 96 hours | 8.1 | 7.7 | 12.1 |
| | 168 hours | 8.8 | 7.6 | 12.6 |
| | 238 hours | | | 11.7 |
| | 305 hours | 7.9 | 6.7 | |
| | 336 hours | | | 10.6 |
| | 504 hours | 7.4 | 6.3 | |
| | 762 hours | 6.5 | 5.4 | |
| | 1008 hours | 5.7 | 4.7 | 6.7 |
| Elongation at Break (EB) retention (%) | 0 hours | 100% | 100% | 100% |
| | 96 hours | 94% | 97% | 86% |
| | 168 hours | 100% | 93% | 79% |
| | 238 hours | | | 73% |
| | 305 hours | 94% | 91% | |
| | 336 hours | | | 61% |
| | 504 hours | 85% | 85% | |
| | 762 hours | 62% | 74% | |
| | 1008 hours | 49% | 57% | 11% |
| Elongation at Beak(%) | 0 hours (original) | 366 | 413 | 339 |
| | 96 hours | 343 | 400 | 293 |
| | 168 hours | 367 | 385 | 268 |
| | 238 hours | | | 248 |
| | 305 hours | 345 | 375 | |
| | 336 hours | | | 206 |
| | 504 hours | 313 | 350 | |
| | 762 hours | 228 | 304 | |
| | 1008 hours | 179 | 235 | 38 |

What is claimed is:

1. A first composition comprising from 30 to 40 wt % of a first ethylene/α-olefin/diene interpolymer and from 60 to 70 wt % of a second ethylene/α-olefin interpolymer, and
wherein the first composition comprises from 0.1 to 1.0 wt % diene, based on the weight of the first composition, and
wherein the first composition comprises from 45 to 65 wt % ethylene, based on the weight of the first composition, and
wherein the first ethylene/α-olefin/diene interpolymer has a weight average molecular weight (Mw) from 250,000 to 500,000 g/mole, and a diene content from 0.40 to 0.60 wt % and has a C2 (polymerized ethylene) content from 55 to 80 wt %, based on the weight of the first ethylene/α-olefin/diene interpolymer, and
wherein the first composition has a weight average molecular weight (Mw) from 200,000 to 280,000 g/mole, a % crystallinity from 0.5% to 12% and has a "% Peak Area (21.3 to 22.0 ppm)" >5.0%, as determined by 13C NMR and the ratio of the C2 (polymerized ethylene) content of the first composition to the C2 (polymerized ethylene) content in the first ethylene/α-olefin/diene interpolymer is from 0.50 to 1.10; and
wherein the ratio of the Mooney Viscosity (ML, 1+4, 125° C.) of the first composition to the Mooney Viscosity (ML, 1+4, 125° C.) of the first ethylene/α-olefin/diene interpolymer is from 0.75 to 1.05.

2. The first composition of claim 1, wherein the first ethylene/α-olefin/diene interpolymer and the second ethylene/α-olefin interpolymer are each, independently, an EPDM.

3. The first composition of claim 1, wherein the first composition has a molecular weight distribution (Mw/Mn) from 2.10 to 3.20.

4. The first composition of claim 1, wherein the first interpolymer and the second interpolymer comprise ≥95 wt % of the total weight of the first composition.

5. A crosslinked composition comprising the first composition of claim 1.

6. An article comprising at least one component formed from the first composition of claim 1.

7. A composition comprising the first composition of claim 1 and an additive.

8. The composition of claim 7, wherein the additive is MgO or ZnO.

9. The composition of claim 7, wherein the first composition is present in an amount from 26 wt % to 42 wt %, based on the weight of the composition.

10. The composition of claim 7, wherein the composition, after 1008 hours, at 150° C., in air, retains ≥50% of its original Tensile Strength, and retains ≥35% of its original Elongation at Break.

11. A crosslinked composition comprising the composition of claim 7.

12. An article comprising at least one component formed from the composition of claim 7.

13. The composition of claim 1, wherein the composition, after 1008 hours, at 150° C., in air, retains ≥50% of its original Tensile Strength, and retains ≥35% of its original Elongation at Break.

* * * * *